(12) United States Patent
Jacobson et al.

(10) Patent No.: US 11,082,839 B2
(45) Date of Patent: *Aug. 3, 2021

(54) MOBILE AUTHENTICATION IN MOBILE VIRTUAL NETWORK

(71) Applicant: Tevnos LLC, San Francisco, CA (US)

(72) Inventors: Stuart Alexander Jacobson, San Francisco, CA (US); Joshua Goldbard, San Francisco, CA (US)

(73) Assignee: Tevnos LLC, San Francisco, CA (US)

( * ) Notice: Subject to any disclaimer, the term of this patent is extended or adjusted under 35 U.S.C. 154(b) by 383 days.

This patent is subject to a terminal disclaimer.

(21) Appl. No.: 16/110,365

(22) Filed: Aug. 23, 2018

(65) Prior Publication Data

US 2019/0098436 A1    Mar. 28, 2019

Related U.S. Application Data

(63) Continuation of application No. 14/934,051, filed on Nov. 5, 2015, now Pat. No. 10,063,998.

(60) Provisional application No. 62/100,816, filed on Jan. 27, 2015, provisional application No. 62/076,703, filed on Nov. 7, 2014.

(51) Int. Cl.
| | |
|---|---|
| *H04L 29/06* | (2006.01) |
| *H04W 12/06* | (2021.01) |
| *H04W 12/08* | (2021.01) |
| *H04W 12/63* | (2021.01) |
| *H04W 12/68* | (2021.01) |

(52) U.S. Cl.
CPC ........... *H04W 12/06* (2013.01); *H04L 63/168* (2013.01); *H04W 12/08* (2013.01); *H04L 63/0853* (2013.01); *H04L 63/0876* (2013.01); *H04W 12/63* (2021.01); *H04W 12/68* (2021.01)

(58) Field of Classification Search
CPC ................. H04W 12/06; H04W 12/08; H04W 12/00503; H04W 12/00508; H04W 12/63; H04W 12/68; H04L 63/168; H04L 63/0853; H04L 63/0876
See application file for complete search history.

(56) References Cited

U.S. PATENT DOCUMENTS

| | | | |
|---|---|---|---|
| 8,625,796 B1 * | 1/2014 | Ben Ayed | H04W 12/068 380/258 |
| 8,771,063 B1 | 7/2014 | Boyle | |
| 2004/0068653 A1 | 4/2004 | Fascenda | |
| 2004/0148343 A1 * | 7/2004 | Mottes | H04W 4/00 709/203 |

(Continued)

FOREIGN PATENT DOCUMENTS

| | | |
|---|---|---|
| EP | 1708528 A1 | 4/2006 |
| EP | 2584809 A1 | 4/2013 |
| WO | 20140122588 A1 | 8/2014 |

OTHER PUBLICATIONS

Dong Hee Shin et al., Analysis of MVNO Diffusion, Feb. 2011, ACM, pp. 1-7. (Year: 2011).*

(Continued)

*Primary Examiner* — Luu T Pham
*Assistant Examiner* — Fahimeh Mohammadi
(74) *Attorney, Agent, or Firm* — Polsinelli PC

(57) ABSTRACT

Systems, methods, and non-transitory computer-readable storage media for using mobile network authentication factors to authenticate a mobile device.

20 Claims, 6 Drawing Sheets

(56) References Cited

U.S. PATENT DOCUMENTS

| | | | |
|---|---|---|---|
| 2004/0162058 A1* | 8/2004 | Mottes | H04M 15/51 |
| | | | 455/411 |
| 2005/0096048 A1 | 5/2005 | Clare et al. | |
| 2006/0129813 A1 | 6/2006 | Narayanan et al. | |
| 2007/0115876 A1* | 5/2007 | Doshi | H04L 29/12047 |
| | | | 370/329 |
| 2008/0311907 A1 | 12/2008 | Watson et al. | |
| 2009/0061869 A1* | 3/2009 | Bui | H04L 61/2015 |
| | | | 455/435.1 |
| 2009/0154413 A1* | 6/2009 | Kim | H04W 28/16 |
| | | | 370/329 |
| 2009/0286509 A1 | 11/2009 | Huber et al. | |
| 2010/0017861 A1* | 1/2010 | Krishnaswamy | H04L 29/06 |
| | | | 726/7 |
| 2010/0027469 A1 | 2/2010 | Gurajala et al. | |
| 2010/0238837 A1* | 9/2010 | Zheng | H04L 12/4679 |
| | | | 370/254 |
| 2010/0330957 A1 | 12/2010 | Harada et al. | |
| 2011/0151890 A1 | 6/2011 | Platt et al. | |
| 2011/0286343 A1* | 11/2011 | Powell | H04W 76/10 |
| | | | 370/252 |
| 2011/0292938 A1* | 12/2011 | Harp | H04L 12/56 |
| | | | 370/392 |
| 2012/0178414 A1* | 7/2012 | Fiatal | H04W 4/20 |
| | | | 455/406 |
| 2012/0204243 A1 | 8/2012 | Wynn et al. | |
| 2013/0054763 A1* | 2/2013 | Van der Merwe | |
| | | | H04L 63/0272 |
| | | | 709/220 |
| 2013/0336210 A1 | 12/2013 | Connor et al. | |
| 2014/0023026 A1* | 1/2014 | Meyer | G06F 3/0482 |
| | | | 370/329 |
| 2014/0068030 A1 | 3/2014 | Chambers et al. | |
| 2014/0073355 A1 | 3/2014 | Ward et al. | |
| 2014/0136847 A1 | 5/2014 | Huang | |
| 2014/0137199 A1 | 5/2014 | Hefetz | |
| 2014/0162684 A1* | 6/2014 | Shaw | G01S 5/00 |
| | | | 455/456.1 |
| 2014/0199962 A1* | 7/2014 | Mohammed | H04W 4/60 |
| | | | 455/406 |
| 2014/0207373 A1 | 7/2014 | Lerenc | |
| 2015/0094021 A1* | 4/2015 | Su | H04W 48/04 |
| | | | 455/411 |

OTHER PUBLICATIONS

Santi Pattanavichai et al., Pricing Models for MVNE in Supporting MVNO Investment in 3G UMTS Network, Nov. 24-25, 2010, IEEE, pp. 82-88. (Year: 2010).*

Miguel Ponce de Leon et al., A User Centric Always Best Connected Service Business Model for MVNOs, Nov. 8, 2010, IEEE, pp. 1-8. (Year: 2010).*

Rebecca Copeland et al., Resolving Ten MVNO Issues with EPS Architecture, VoLTE and Advanced Policy Server, Oct. 4-7, 2011, IEEE, pp. 29-34. (Year: 2011).*

Baliga, Arati, et al.; "VPMN—Virtual Private Mobile Network Towards Mobility-as-a-Service"; Jun. 28, 2011; ACM; pp. 7-12.

Liang, Chengchao, et al.; "Wireless Network Virtualization: A Survey, Some Research Issues and Challenges"; Aug. 28, 2014; IEEE; vol. 17, Issue 1; pp. 358-380.

Pavlovski, Christopher J., et al.; "Digital Media and Entertainment Service Delivery Platform"; Nov. 11, 2005; ACM; pp. 47-54.

Ponce de Leon, Miguel, et al.; "A User Centric Always Best Connected Service BUsiness Model for MVNOs"; Nov. 8, 2010; IEEE; pp. 1-8.

* cited by examiner

MOBILE AUTHENTICATION IN MOBILE VIRTUAL NETWORK

CROSS REFERENCE TO RELATED APPLICATIONS

This application is a continuation of U.S. non-provisional application Ser. No. 14/934,051 filed on Nov. 5, 2015, which claims priority to U.S. provisional application No. 62/076,703 filed on Nov. 7, 2014 and to U.S. provisional application No. 62/100,816, filed on Jan. 7, 2015, each of which are expressly incorporated by reference herein in their entireties.

TECHNICAL FIELD

The present technology pertains to network authentication and more specifically pertains to authenticating devices in a mobile network.

BACKGROUND

Enterprise communications networks achieve security by identifying authorized users, authorized devices (e.g. computers, printers, and phones) with hardware identifiers (e.g. Ethernet MAC addresses), and authorized routers with known locations through which the devices may connect, and modulating access and usage based on the content/time of activity and the user, device identifier (deviceId), assumed device-type, and router which is engaging in that activity. Usually this modulation takes the form of assigning devices IP addresses based on the router, and controlling the routing of traffic using rules about assigned IP addresses. Physical access control to the devices (e.g. locks on office doors) is therefore an important component of enterprise security.

However, increasingly, users need access to both enterprise as well as cloud services from outside the enterprise network (usually via mobile devices), both of which challenge the traditional enterprise IP based security model. Authentication in these cases involves more frequent password challenges with more aggressive password change policies as well as various forms of "two factor authentication" technology which generally takes the form of delivering a temporary unique code to the user on another channel (voice call, SMS, or securID card) and having them enter that in addition to their passwords. Both increased password challenges and increases second factor challenges inconvenience the user and interrupt flow. Passwords are subject to various forms of attack including phishing, password guessing, cross-site-scripting, and various man-in-the-middle attacks. The SMS and voice-call second factor challenge have vulnerabilities due to various call and SMS forwarding services. SecurId requires the user to remember to carry another physical device that may be stolen when not in use without being noticed by the user until the next challenge. None of these techniques provide network based location information that is often a useful security heuristic.

Cloud services (such as SalesForce) can achieve increased security by configurations that allow authorized access from particular enterprise networks from enterprise single-sign-on services or VPNs, but that means increased network latency for mobile users who have to route traffic into and then out of the enterprise network to access these services.

What is needed is a way for enterprise and cloud services to authenticate and secure sessions with mobile devices that works as well as direct access using on premises network hardware. What is helpful is that modern mobile devices typically carry SIM cards, which allow cryptographically secure challenge-response communications that verify possession of physical SIM which are used by the carriers to authenticate mobile devices to mobile networks for access and billing purposes.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Some embodiments of the present technology involve systems, methods, and computer-readable mediums for providing enterprises and cloud service access control systems with access to mobile authentication factors. The mobile authentication factors can be directly available to a mobile carrier or mobile virtual network operator (MVNO) with the radio connection to the device.

The present technology can also involve a security system that functions as the Internet Service Provider (ISP) or gateway by which the mobile device accesses the enterprise network and the Internet. In some embodiments, the security system can assign the mobile devices an IP address and can route traffic.

Some embodiments involve a mobile virtual network operator (MVNO) hosting a mobile authentication platform that registers mobile devices as being a part of the enterprise, assigning the devices with network identifiers based on a device identifier, and authenticating requests for network resources when a requesting device has matching network identifier and/or other matching mobile authentication information such as location information.

The MVNO hosted mobile authentication platform can receive a request from a mobile device to access an enterprise's network. When the mobile device makes contact with a cellular tower, the mobile device can specify an Access Point Name (APN) that dictates that the mobile device makes a connection to the MVNO hosted mobile authentication platform and that the mobile the mobile authentication platform to inspect a network identifier of the mobile device making a request. The MVNO hosted mobile authentication platform can maintain a database of network identifiers assigned to mobile devices of registered members of the enterprise network to determine that the mobile device is used by a member of the enterprise.

The network identifier can be assigned to the mobile device based on one or more mobile authentication factors for the mobile device including the SIM number, the MAC address, one or more location identifier, etc.

Once the MVNO hosted mobile authentication platform configures a device with a network identifier, the device can make resource requests to access resources through the enterprise's dedicated connection. When a resource request is received, the MVNO hosted mobile authentication platform can extract one or more resource request factors (such as the IP address of the requesting device, a location of the device determined by a low-level operating system, etc.) and can authenticate the mobile device when the mobile authentication factors respectively correspond with the one or more resource request factors.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Figure 1:
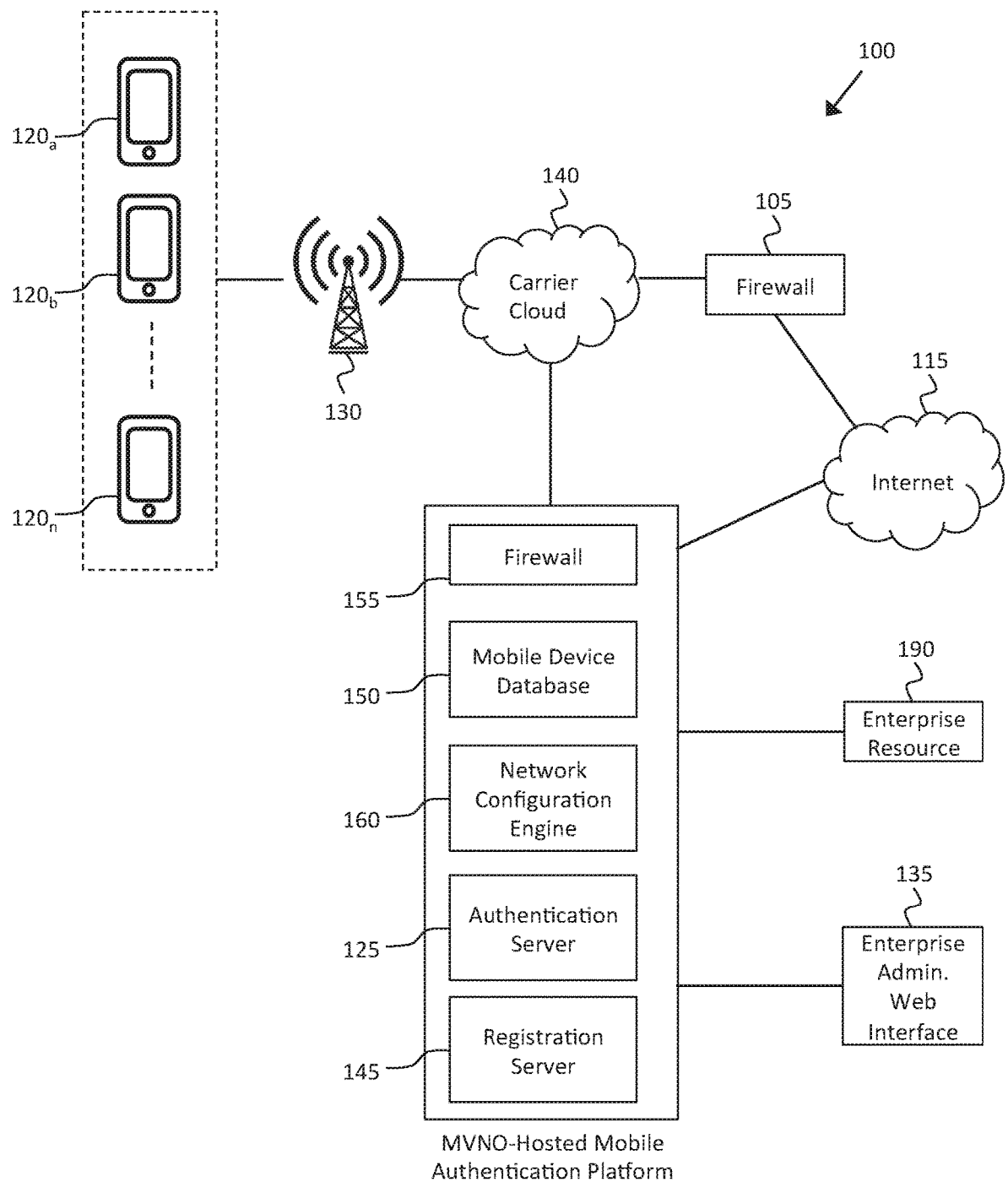
FIG. 1 illustrates an example of a mobile authentication platform in a mobile network environment according to some embodiments of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Some embodiments of the present technology involve systems, methods, and computer-readable mediums by which wireless carriers and mobile virtual network operators (MVNOs) provide enterprise and cloud service access control systems with access to mobile factors directly available to the mobile carrier or MVNO with the radio connection to the device. The mobile factors can include the SIM card number associated with the mobile device, the location of the mobile device inferred by the mobile towers that can see it, the operators of those mobile towers, and a challenge response interface to verify that the carrier is truly carrying information from a device with that SIM card number. It may also include the device type (e.g. iPhone 6s vs Google Nexus vs MiFi).

Mobile network carriers can provide a mobile virtual network operator (MNVO) access to the carrier's radio spectrum allocation and network infrastructure. The disclosed technology addresses the need in the art for systems, methods, and computer-readable mediums for authenticating requests from MVNO customers for network resources based on mobile device authentication factors.

Authenticating user based on mobile device authentication factors provides a secure solution for businesses, governmental and non-profit organizations, and other enterprises. For example, an enterprise can register all of its employees/members mobile devices with the MVNO and the MVNO, through its unique position between the carrier and the end user, can provide additional levels of authentication for ensuring that requests purportedly from a mobile device can be trusted.

Although an MVNO-hosted authentication server for authenticating members of an enterprise is described above, those with ordinary skill in the art having the benefit of this disclosure will readily appreciate that a wide variety of users and network entities can benefit from mobile factor authentication.

In some embodiments of the present technology, a mobile authentication platform can register mobile devices with an authentication service and can examine requests for network resources to ensure that only authenticated devices are given access to the resources.

The authentication platform can receive a request from a mobile device to access a network resource. When the mobile device connects with a cellular tower, the mobile device can specify an Access Point Name (APN) that dictates that the mobile device makes a connection to the mobile authentication platform and that the mobile device allows the authentication platform to inspect a request. The authentication platform can be hosted by a wide variety of entities (e.g. a MVNO, an enterprise, a cloud computing service, etc.) and the authentication platform receives requests from devices when the APN specifies that the request be directed to the hosting entity.

Similarly, the authentication platform can receive requests that originate from a wireless network and verify device factors (e.g. MAC address) when an access point (e.g. a wireless router) routes traffic to the authentication platform.

In some embodiments, the mobile authentication platform can be hosted by an MVNO and can include one or more mobile authentication server, a registration engine for registering mobile devices, and a network configuration engine for negotiating network configuration parameters with mobile devices.

In some embodiments, the mobile authentication platform can provide an enterprise the ability to register mobile devices in an enterprise network, store authentication information for the mobile devices, monitor requests for enterprise resources, and authenticate mobile devices in the enterprise based on the expected authentication information matching actual information received in the requests.

FIG. 1 illustrates an example of a mobile authentication platform 110 in a mobile network environment 100 according to some embodiments of the present technology. The mobile network environment 100 includes mobile devices $120_a, 120_b, \ldots 120_x$ in communication with a cellular carrier network 130 through one or more cellular tower 130.

The mobile authentication platform 110 can be hosted by a mobile virtual network operator (MVNO). The MVNO can register devices for an enterprise to use the mobile authentication platform 110. For example, an enterprise administrator web interface 135 can be published and can be used by an enterprise administrator to sign up for mobile factor authentication, to register user devices, to define permissions, etc. The mobile authentication platform 110 can also include a registration engine 145 for receiving registration data and a mobile device database 150 for storing information about registered devices. For example, an enterprise administrator can register a mobile device by entering an existing device address (e.g. a MAC address, a subscriber identification module (SIM) number, etc.) in the enterprise administration web interface 135 and the registration engine 145 can cause the mobile device database 150 to store a record of the device address belonging to a mobile device that is part of the enterprise.

Also, as will be explained in greater detail below, the MVNO can arrange a dedicated connection between one or more of the mobile devices $120_a, 120_b, \ldots 120_x$ and the mobile authentication platform 110 when a mobile device is registered with the mobile authentication platform 110. Otherwise, requests from the mobile devices $120_a$, $120_b$, ... $120_x$ can involve a traditional workflow of sending the traffic from the mobile devices $120_a$, $120_b$, ... $120_x$ over the public internet 115 and firewall 105.

The mobile authentication platform 110 can also include a security system that uses mobile authentication factors to determine when to allow access to enterprise resources and how to route Internet request. The security system can be an authentication server 125 and, when one or more of the mobile devices $120_a$, $120_b$, ... $120_x$ is connected to the mobile authentication platform 110, the authentication server 125 can authenticate the device. The mobile authentication platform 110 can also include a firewall 155 to present one or more challenge to a requesting device.

The authentication server 125 and/or the firewall 155 can determine when to allow mobile devices with access to the Internet 115 and/or access to one or more access-restricted resource 190. For example, the authentication server 125 can limit access to an enterprise resource to mobile devices that have been registered with the enterprise.

Additionally, the mobile authentication platform 110 can include a network configuration engine 160 that assigns network addresses (e.g. IP addresses) to devices that request access to network resources through the mobile authentication platform 110. For example, when a mobile device registered with the mobile authentication platform 110 attempts to access the Internet 115 or an access-restricted resource 190, the network configuration engine 160 can negotiate with the device and assign the device a network address. Additionally, the network configuration engine 160 can access one or more authentication factors (e.g. a unique subscriber identification module (SIM) number, a location of the device, and an identification of one or more mobile towers in the proximity of the location of the device, etc.) from the requesting device and can use the authentication factors to generate the network address. The mobile authentication platform 110 can store the authentication factors in the mobile device database 150 and then, when a request for resources is received from the device (or a device purporting to the be the device, spoofing the device, etc), the mobile authentication platform 110 can use the network address to access the authentication factors.

Next, the authentication server 125 can extract, from the request, actual factors from the requesting device and can authenticate the mobile device when expected mobile authentication factors correspond with the one or more actual factors from the request. For example, the authentication server 125 can flag requests for network resources that arrive from a registered mobile device having a network address other than that assigned to it by the network configuration engine 160.

In addition to the requiring that the network address match the assigned network address, the authentication server 125 can extract further authentication factors from network request and compare to the authentication factors stored for the mobile device. For example, the authentication server 125 can access a location identification using cellular triangulation from the device's lower level operating system and use this location data as an actual factor that would be required to match the expected location data (e.g. that was based on application layer location data) stored for the mobile device when the network configuration engine 160 assigned the mobile device its network address.

Current systems are subject to abuse because they rely on the user's device to provide meaningful information with which to verify the user's identity. For example, if a user's device has been contaminated in some fashion, the device might present its location through the application layer as being somewhere different from its actual location. Because the application layer that is most commonly accessible on mobile devices is not the underlying network access operating system, a second heuristic can be gathered confirming the location of the device without relying on the top-level operating system.

To explain further, on some devices, there is the top-level operating system, which might contain an application that a user is attempting to authenticate to using an IP connection. When the authentication request is made, the authentication server 125 will make a request to the handset operator's mobile network requesting a location identification using the device's lower level operating system (e.g. using strength of the signal of a SIM/IMSI signal as it is received by a cellular tower). Because the lower level operating system has a higher burden of entry as compared to the top-level operating system it is unlikely that an attacker would be able to spoof both levels of location identity. By matching the information provided by the lower level operating system to the top-level application signature, the identity of a user can be confirmed with greater certainty.

The dedicated connection between the mobile devices $120_a$, $120_b$, ... $120_x$ and the MVNO-hosted mobile authentication platform 110 reduces opportunities for third parties to engage in man-in-the-middle attacks and lowers communication latency between the mobile devices $120_a$, $120_b$, ... $120_x$ and the enterprise. Also using mobile network authentication factors provides better heuristics for authenticating the mobile devices to which it is communicating as compared with application level passwords with more convenience and security than most other forms of two factors or no password authentication. Also, use of the virtual network provides additional protection from the mobile carrier itself and allows the lower latency enterprise network to negotiate secure connections with other networks rather than forcing public key session negotiation over longer latency mobile connections (and to turn off insecure connections).

An MVNO-hosted mobile authentication platform can support an entire enterprise and register all of its mobile devices. The mobile authentication platform can also provide administrative tools, interfaces, etc. for the enterprise to manage its mobile fleet.

An enterprise can on-board new mobile devices by registering a user's existing device identifier(s) (e.g. SIM number, MAC address, etc) or by ordering an already-registered device from the MVNO-hosted mobile authentication platform. Either way, the authentication platform can register the devices for the enterprise, provide a dedicated connection for allowing the enterprise devices to use the authentication platform, authenticate requests using the dedicated connection, and bill the enterprise based on usage.

Figure 2:
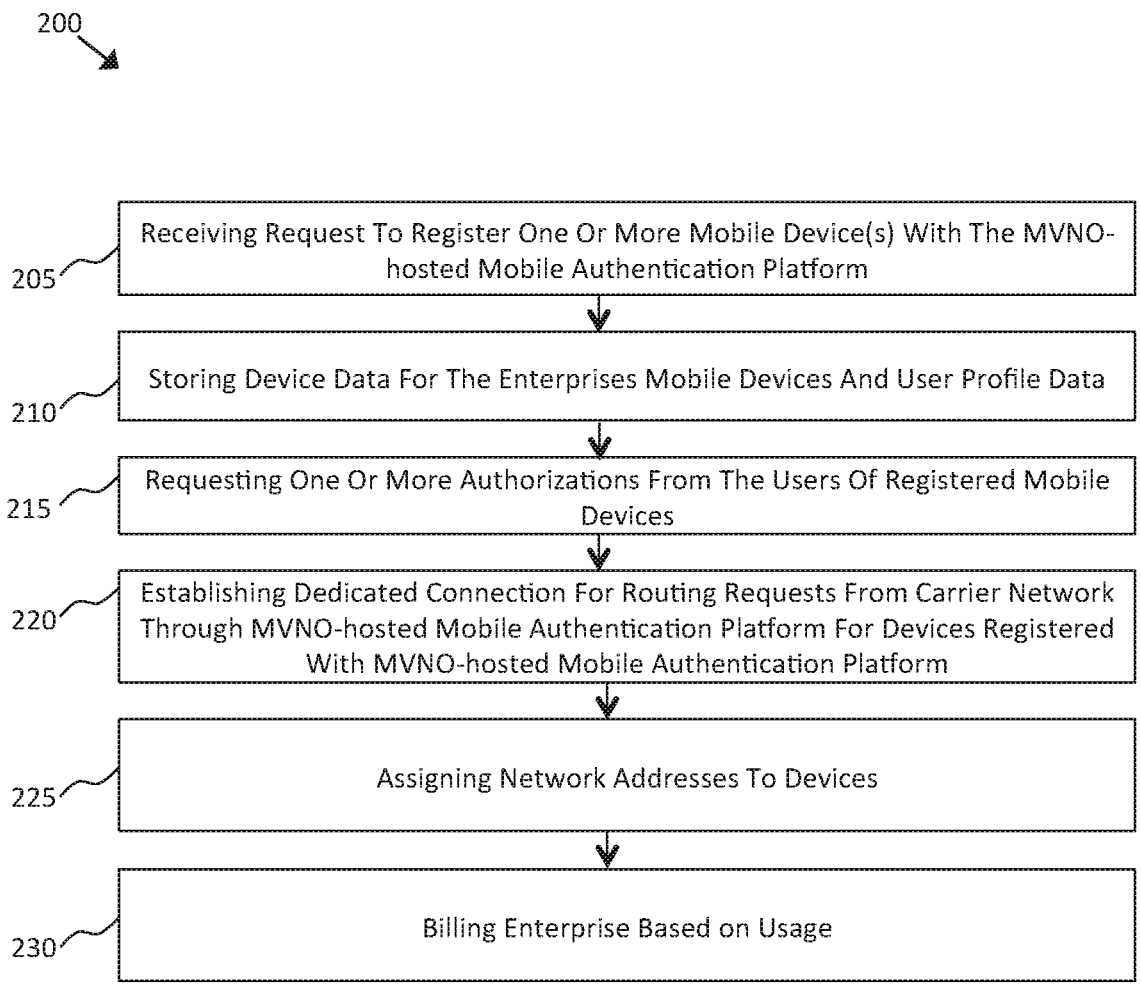
FIG. 2 illustrates a method of registering mobile devices with an MVNO-hosted mobile authentication platform according to some embodiments of the present technology.

FIG. 2 illustrates a method 200 of registering mobile devices with an MVNO-hosted mobile authentication platform according to some embodiments of the present technology. The method 200 involves receiving a request to register one or more mobile device(s) with the MVNO-hosted mobile authentication platform 205. As explained above, the request can be made from an enterprise administrator and can be made by registering an existing device identifier (e.g. SIM number, MAC address, etc.), ordering a new device that is already registered with the authentication platform, ordering SIM cards for existing devices where the SIM cards are already registered with the authentication platform.

The method 200 can also involve the MVNO-hosted mobile authentication platform storing device data for the enterprises mobile devices and user profile data 210. For example, the MVNO-hosted mobile authentication platform can store user data that identifies the users' position in the enterprise (e.g. for enforcing permissions).

Optionally, the method 200 can involve the MVNO-hosted mobile authentication platform requesting one or more authorizations from the users of registered mobile devices 215. For example, the MVNO-hosted mobile authentication platform can request that the users consent to the MVNO-hosted mobile authentication platform using their location data to authenticate the mobile device. Also, the MVNO-hosted mobile authentication platform can request whether the users would like to opt-in to the MVNO-hosted mobile authentication platform accessing the user's personal data to better authenticate the user. For example, users can opt-in to allowing the MVNO-hosted mobile authentication platform to access the user's calendar information, digital travel information (e.g. through airline application), commuting application (e.g. Uber) for determining the user's location to use as an authentication factor.

Once the enterprise registers mobile devices with the MVNO-hosted mobile authentication platform, the method 200 can involve the MVNO-hosted mobile authentication platform establishing a dedicated connection for routing requests from the carrier network through the MVNO-hosted mobile authentication platform for all devices registered with the MVNO-hosted mobile authentication platform 220.

The method 200 also involves a network configuration engine in the MVNO-hosted mobile authentication platform assigning network addresses (e.g. IP addresses) to devices based on the device identifiers, location information, etc. when the mobile devices request resources 225.

Subsequently, when the registered devices are used to request resources, the method 200 involves the MVNO-hosted mobile authentication platform billing the enterprise based on usage 230.

After the MVNO-hosted mobile authentication platform on-boards members of an enterprise, the authentication server can inspect requests for resources over the dedicated connection and authenticate the devices making the requests when expected mobile authentication factors (network addresses, location data, etc.) match the data in a request for resources.

Figure 3:
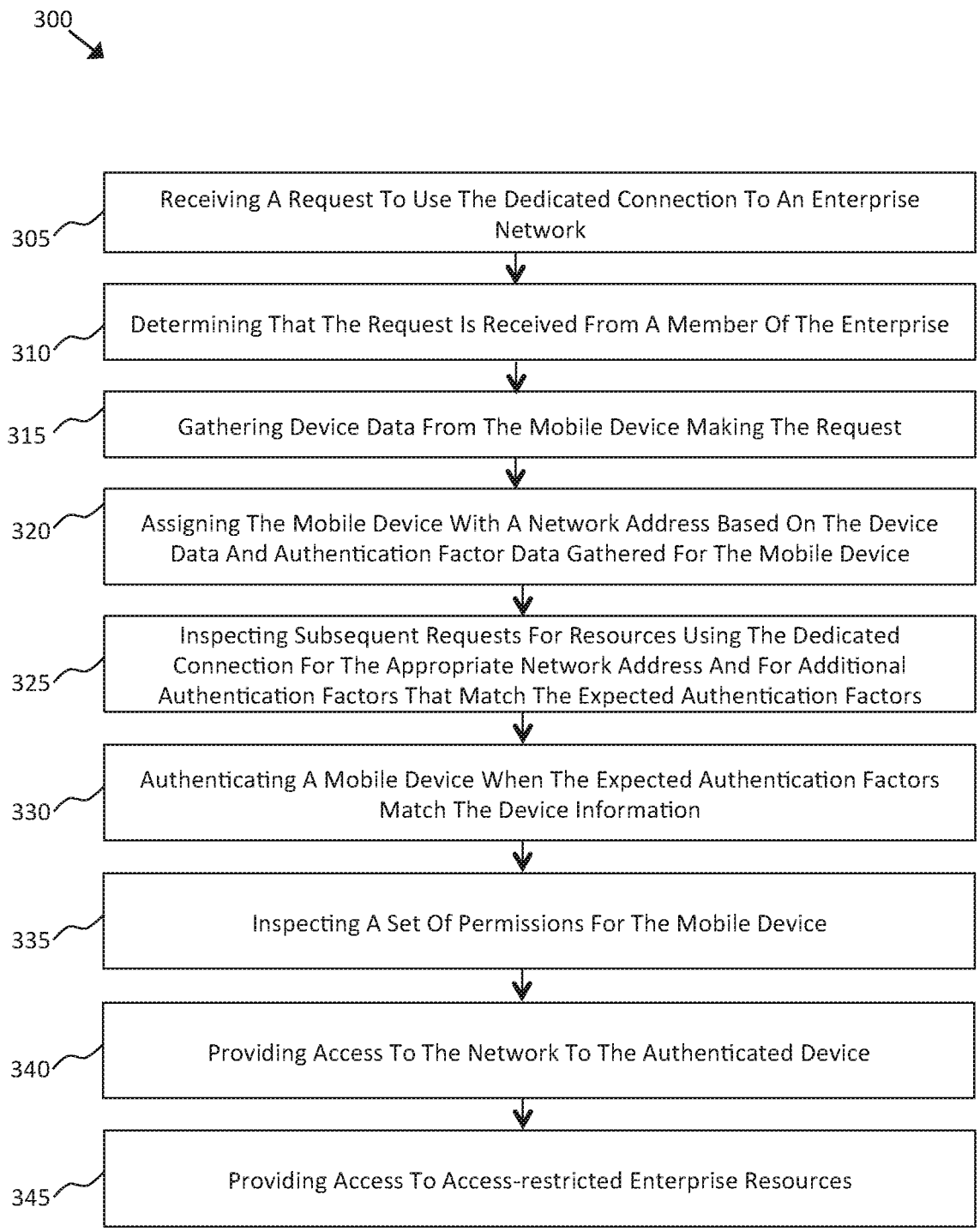
FIG. 3 illustrates a method of authenticating mobile devices on an MVNO-hosted mobile authentication platform according to some embodiments of the present technology.

FIG. 3 illustrates a method 300 of authenticating mobile devices on an MVNO-hosted mobile authentication platform according to some embodiments of the present technology. The method 300 involves receiving a request to use the dedicated connection to an enterprise network 305 and determining that the request is received from a member of the enterprise 310.

Next, the method 300 involves gathering device data about the mobile device making the request 315. For example, the MVNO-hosted mobile authentication platform can gather a device identifier (e.g. SIM number, MAC address, etc.) and other authentication factors, e.g. location data from a carrier. The method 300 then involves a network configuration engine of the MVNO-hosted mobile authentication platform assigning the mobile device with a network address based on the device data and authentication factor data gathered for the mobile device 320.

The method 300 involves inspecting subsequent requests for resources using the dedicated connection for the appropriate network address and for additional authentication factors that match the expected authentication factors 325. For example, the MVNO-hosted mobile authentication platform can determine to allow network traffic when the request is received from a device having an IP address assigned to it from the network configuration engine and when location data previously gathered from an application layer matches location data reported by a baseband layer during a request.

The method 300 involves authenticating a mobile device when the expected authentication factors match the device information 330. Optionally, the method 300 can involve inspecting a set of permissions for the mobile device 335 by looking up a profile of the user of the device based on the data extracted from the request. Based on the device being authenticated and/or the permissions, the method 300 can involve providing access to the network to the authenticated device 340 and providing access to access-restricted enterprise resources 345 when the device has the appropriate permissions. Likewise, the enterprise can block certain network resources (e.g. social media websites) on certain mobile devices by throttling requests coming from mobile devices with IP address that is based on a SIM associated with the banned devices.

In some embodiments of the present technology, the mobile authentication platform can also register mobile devices that provide additional function in an enterprise. For example, an enterprise administrator can register a cellular network-based hotspot device that can be authenticated on the mobile authentication platform and can be used to provide connectivity to other devices. For example, a cellular network-based hotspot device can act as a WiFi router and connect to a printer so the mobile devices using the dedicated connection can use the printer. In addition to the cellular network-based hotspot device SIM card information, the administrator can register the cellular network-based hotspot device function in the enterprise with the mobile authentication platform so that the other mobile devices can discover the printer.

As explained above, although an MVNO-hosted authentication server for authenticating members of an enterprise is described above, those with ordinary skill in the art having the benefit of this disclosure will readily appreciate that a wide variety of users and network entities can benefit from mobile factor authentication.

Some embodiments involve a security system that maintains a database of users, SIMs with which they are authorized to use to connect, carriers that may deliver traffic associated with those SIMS, and locations (which can updated by time of day and calendar of users that opt in to sharing personal data) from which those devices may connect on behalf of those users, and policies about what may be done by a user from a particular device in a particular location with a particular level of confidence in that location and carrier. Some embodiments involve security systems that maintain only a subset of these access constraints.

In some embodiments, the security system functions as the Internet Service Provider (ISP) or gateway by which the mobile device accesses the enterprise network and the Internet. In some embodiments, the security system can assign the mobile devices an IP address and can route traffic.

In some embodiments, enterprise level Mobile Device Management (MDM) software is installed on the mobile device to require it to communicate with the Internet only through an enterprise VPN with these security properties. This allows the enterprise complete visibility on all device activity as if it was on the enterprise physical network.

Some embodiments of the present technology involve cloud computing in the form of accessing enterprise resources through a MVNO platform or other network.

Figure 4:
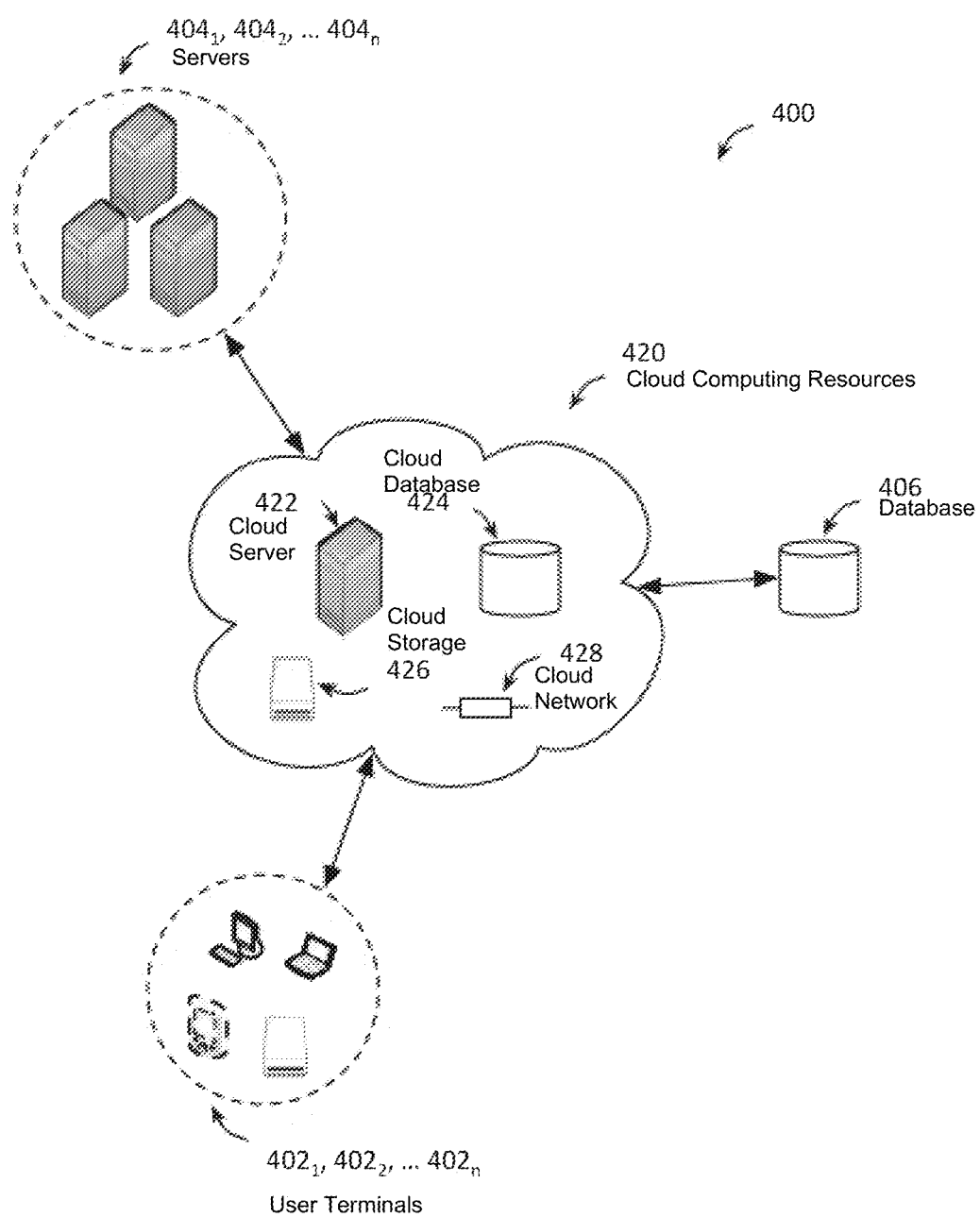
FIG. 4 illustrates an exemplary cloud computing system.

Cloud computing is a type of Internet-based computing in which a variety of resources are hosted and/or controlled by an entity and made available by the entity to authorized users via the Internet. An exemplary cloud computing system configuration 400 is illustrated in FIG. 4 wherein a variety of electronic devices can communicate via a network for purposes of exchanging content and other data. The system can be configured for use on a wide variety of network configurations that facilitate the intercommunication of electronic devices. For example, each of the components of system 400 in FIG. 4 can be implemented in a localized or distributed fashion in a network.

System 400 can be configured to include cloud computing resources 420. The cloud resources can include a variety hardware and/or software resources, such as cloud servers 422, cloud databases 424, cloud storage 426, cloud networks 428, cloud applications, cloud platforms, and/or any other cloud-based resources. In some cases, the cloud resources are distributed. For example, cloud storage 426 can include multiple storage devices. In some cases, cloud resources can be distributed across multiple cloud computing systems and/or individual network enabled computing devices. For example, cloud computing resources 420 can communicate with servers $404_1$, $404_2$, ..., $404_n$ (collectively "404"), database 406, and/or any other network enabled computing device to provide the cloud resources.

Furthermore, in some cases, the cloud resources can be redundant. For example, if cloud computing resources 420 is configured to provide data backup services, multiple copies of the data can be stored such that if one storage resource is unavailable the data will still be available to the user. In another example, if cloud computing resources 420 is configured to provide software, the software can be available from different cloud servers so that the software can be served from the closest server.

In system 400, a user interacts with the cloud computing resources 420 through user terminals $402_1$, $402_2$, ..., $402_n$ (collectively "402") connected to a network by direct and/or indirect communication. Cloud computing resources 420 can support connections from a variety of different electronic devices, such as servers; desktop computers; mobile computers; handheld communications devices, e.g., mobile phones, smart phones, tablets; set top boxes; network-enabled hard drives; and/or any other network-enabled computing devices. Furthermore, cloud computing resources 420 can concurrently accept connections from and interact with multiple electronic devices.

Cloud computing resources 420 can provide cloud resources through a variety of deployment models, such as public, private, community, hybrid, and/or any other cloud deployment model. In some cases, cloud computing resources 420 can support multiple deployment models. For example, cloud computing resources 420 can provide one set of resources through a public deployment model and another set of resources through a private deployment model.

In some configurations, a user terminal $402_i$ can access cloud computing resources 420 from any location where an Internet location is available. However, in other cases, cloud computing resources 420 can be configured to restrict access to certain resources such that a resource can only be accessed from certain locations. For example, if cloud computing resources 420 is configured to provide a resource using a private deployment model, then cloud computing resources 420 can restrict access to the resource, such as by requiring that a user terminal $402_i$ access the resource from behind a firewall.

Cloud computing resources 420 can provide cloud resources to user terminals 402 through a variety of service models, such as Software as a Service (SaaS), Platforms as a service (PaaS), Infrastructure as a Service (IaaS), and/or any other cloud service models. In some cases, cloud computing resources 420 can provide multiple service models to a user terminal $402_i$. For example, cloud computing resources 420 can provide both SaaS and IaaS to a user terminal $402_i$. In some cases, cloud computing resources 420 can provide different service models to different user terminals 402. For example, cloud computing resources 420 can provide SaaS to user terminal $402_1$ and PaaS to user terminal $402_2$.

In some cases, cloud computing resources 420 can maintain an account database. The account database can store profile information for registered users. The profile information can include resource access rights, such as software the user is permitted to user, maximum storage space, etc. The profile information can also include usage information, such as computing resources consumed, data storage location, security settings, personal configuration settings, etc.

Cloud computing resources 420 can provide a variety of functionality that requires user interaction. Accordingly, a user interface (UI) can be provided for communicating with cloud computing resources 420 and/or performing tasks associated with the cloud resources. The UI can be accessed via an end user terminal $402_i$ in communication with cloud computing resources 420. The UI can be configured to operate in a variety of client modes, including a fat client mode, a thin client mode, or a hybrid client mode, depending on the storage and processing capabilities of cloud computing resources 420 and/or the user terminal $402_i$. Therefore, a UI can be implemented as a standalone application operating at the user terminal in some embodiments. In other embodiments, a web browser-based portal can be used to provide the UI. Any other configuration to access cloud computing resources 420 can also be used in the various embodiments.

As described above, in some configurations, the cloud computing resources can be used to store user data. The present disclosure contemplates that, in some instances, this gathered data might include personal and/or sensitive data. The present disclosure further contemplates that the entities responsible for the collection, analysis, disclosure, transfer, storage, or other use of such data should implement and consistently use privacy policies and practices that are generally recognized meeting or exceeding industry or governmental requirements for maintaining personal information data private and secure. For example, personal data from users should be collected for legitimate and reasonable uses of the entity and not shared or sold outside of those legitimate uses. Further, such collection should occur only after the informed consent of the users. Additionally, such entities should take any needed steps for safeguarding and securing access to such personal data and ensuring that others with access to the personal data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal data. That is, the present disclosure contemplates that hardware and/or software elements can be provided to prevent or block access to such personal data. For example, the present technology can be configured to allow users to select the data that is stored in cloud storage.

Therefore, although the present disclosure broadly covers use of personal data to implement one or more various disclosed embodiments, the present disclosure also contemplates that the various embodiments can also be implemented without the need for accessing such personal data. That is, the various embodiments of the present technology are not rendered inoperable due to the lack of all or a portion of such personal data. For example, non-personal data can be stored in cloud storage.

Figure 5A:
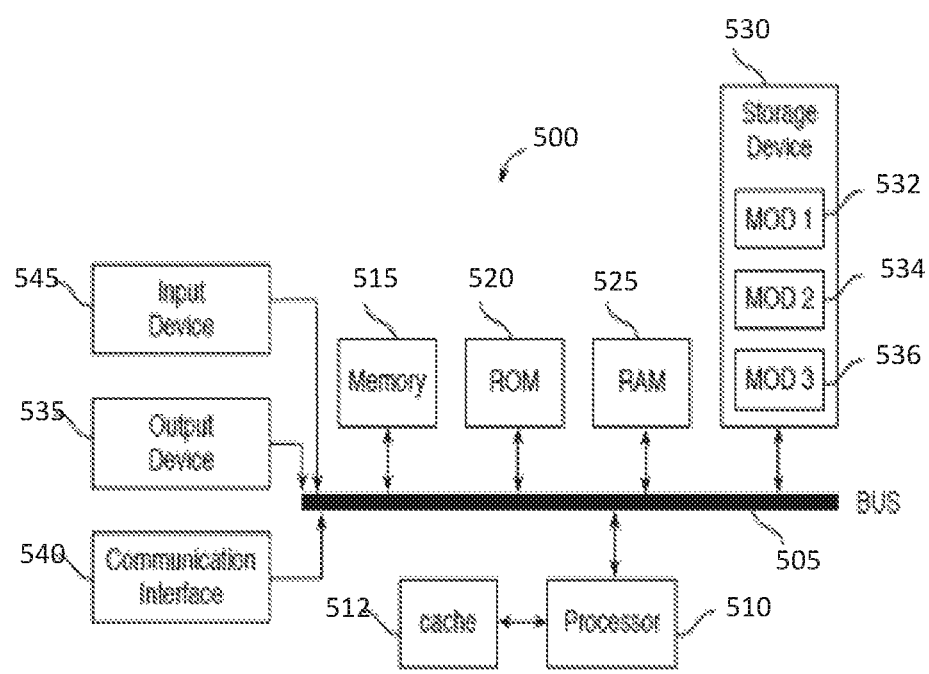
FIG. 5A and FIG. 5B illustrate exemplary possible system embodiments.
Figure 5B:
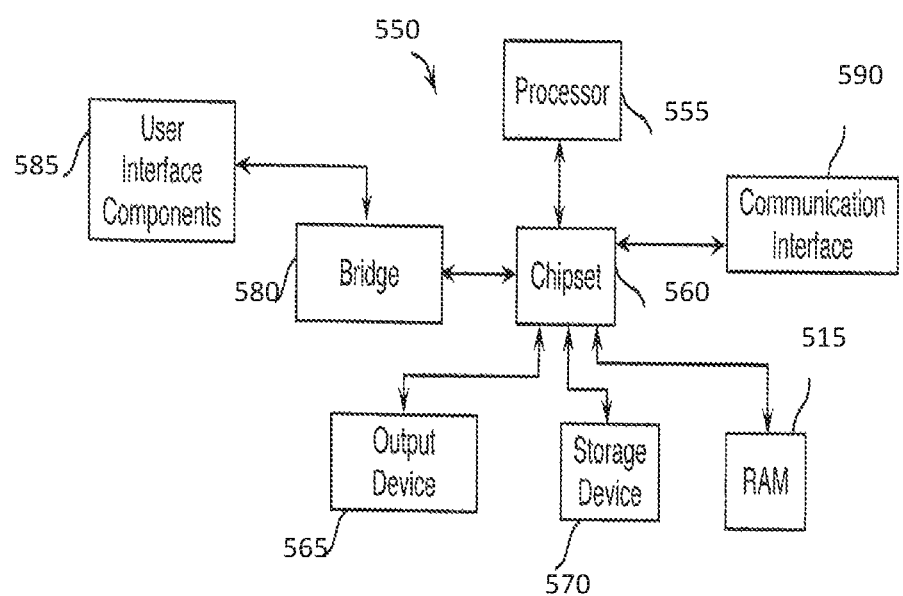

FIG. 5A and FIG. 5B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A mobile virtual network operator ("MVNO")-hosted mobile authentication platform comprising:
   one or more processors; and
   at least one non-transitory computer-readable storage medium having stored therein instructions which, when executed by the one or more processors, cause the one or more processors to:
   receive, from a registered mobile device of the MVNO-hosted mobile authentication platform, an access request to access an enterprise network associated with the MVNO;
   determine that the access request is received from a member of the enterprise network;
   gather device data and authentication factor data for the registered mobile device;
   assign a network address for accessing the enterprise network over a dedicated connection for the enterprise network through the MVNO-hosted mobile authentication platform based on the device data and the authentication factor data to the registered mobile device;
   control access of the registered mobile device to the enterprise network over the dedicated connection based on the network address assigned to the registered mobile device;
   inspect subsequent requests from the registered mobile device to access one or more resources of the enterprise network including one or more access-restricted enterprise resources of the enterprise network using the dedicated connection;
   look up user permissions of a user of the registered mobile device; and
   control access of the registered mobile device to access the one or more resources for the subsequent requests based on the user permissions and the network address assigned to the registered mobile device.

2. The MVNO-hosted mobile authentication platform of claim 1, wherein the instructions which, when executed by the one or more processors, further cause the one or more processors to control access of the registered mobile device to the one or more resources over the dedicated connection using the network address assigned to the registered mobile device and based on whether one or more additional authentication factors correspond to one or more authentication factors of the authentication factor data.

3. The MVNO-hosted mobile authentication platform of claim 2, wherein the one or more additional authentication factors include first location data and the one or more authentication factors of the authentication factor data includes second location data, and the MVNO-hosted mobile authentication platform is further configured to control access of the registered mobile device to the enterprise network based on whether the first location data matches the second location data.

4. The MVNO-hosted mobile authentication platform of claim 3, wherein the first location data includes a baseband-derived location identification and the second location data includes an application layer-derived device location identification.

5. The MVNO-hosted mobile authentication platform of claim 1, wherein the device data includes a unique subscriber identification module ("SIM") number.

6. The MVNO-hosted mobile authentication platform of claim 1, wherein the instructions which, when executed by the one or more processors, further cause the one or more processors to establish the dedicated connection in response to a request to register one or more mobile devices, including the registered mobile device, with the MVNO-hosted mobile authentication platform.

7. The MVNO-hosted mobile authentication platform of claim 6, wherein the request to register the one or mobile devices is generated by the enterprise network.

8. The MVNO-hosted mobile authentication platform of claim 6, wherein the instructions which, when executed by the one or more processors, further cause the one or more processors to store user data of a user associated with the registered mobile device in response to the request to register the one or more mobile devices with the MVNO-hosted mobile authentication platform.

9. A computer-implemented method comprising:
   receiving, from a registered mobile device of a MVNO-hosted mobile authentication platform, an access request to access an enterprise network associated with the MVNO;
   determining that the access request is received from a member of the enterprise network;
   gathering device data and authentication factor data for the registered mobile device;

assigning, by the MVNO-hosted mobile authentication platform, a network address for accessing the enterprise network over a dedicated connection for the enterprise network through the MVNO-hosted mobile authentication platform based on the device data and the authentication factor data to the registered mobile device;

controlling, by the MVNO-hosted mobile authentication platform, access of the registered mobile device to the enterprise network over the dedicated connection based on the network address assigned to the registered mobile device;

inspecting subsequent requests from the registered mobile device to access one or more resources of the enterprise network including one or more access-restricted enterprise resources of the enterprise network using the dedicated connection;

looking up user permissions of a user of the registered mobile device; and controlling access of the registered mobile device to access the one or more resources for the subsequent requests based on the user permissions and the network address assigned to the registered mobile device.

10. The computer-implemented method of claim 9, further comprising controlling, by the MVNO-hosted mobile authentication platform, access of the registered mobile device to the one or more resources over the dedicated connection using the network address assigned to the registered mobile device and based on whether one or more additional authentication factors correspond to one or more authentication factors of the authentication factor data.

11. The computer-implemented method of claim 10, wherein the one or more additional authentication factors include first location data and the one or more authentication factors of the authentication factor data includes second location data and the method further comprises controlling, by the MVNO-hosted mobile authentication platform, access of the registered mobile device to the enterprise network based on whether the first location data matches the second location data.

12. The computer-implemented method of claim 11, wherein the first location data includes a baseband-derived location identification and the second location data includes an application layer-derived device location identification.

13. The computer-implemented method of claim 9, further comprising establishing, by the MVNO-hosted mobile authentication platform, the dedicated connection in response to a request to register one or more mobile devices, including the registered mobile device, with the MVNO-hosted mobile authentication platform.

14. The computer-implemented method of claim 13, wherein the request to register the one or mobile devices is generated by the enterprise network.

15. The computer-implemented method of claim 13, further comprising storing, by the MVNO-hosted mobile authentication platform, user data of a user associated with the registered mobile device in response to the request to register the one or more mobile devices with the MVNO-hosted mobile authentication platform.

16. The computer-implemented method of claim 9, wherein the device data includes a unique subscriber identification module ("SIM") number.

17. A system comprising:
one or more servers configured to host a mobile virtual network operator ("MVNO")-hosted mobile authentication platform for an enterprise network;
a non-transitory computer-readable medium storing instructions that, when executed by one or more computer processors of a server, cause the MVNO-hosted mobile authentication platform to:
receive, from a registered mobile device of the MVNO-hosted mobile authentication platform, an access request to access an enterprise network associated with the MVNO;
determine that the access request is received from a member of the enterprise network;
gather device data and authentication factor data for the registered mobile device;
assign a network address for accessing the enterprise network over a dedicated connection for the enterprise network through the MVNO-hosted mobile authentication platform based on the device data and the authentication factor data to the registered mobile device;
control access of the registered mobile device to the enterprise network over the dedicated connection based on the network address assigned to the registered mobile device;
inspect subsequent requests from the registered mobile device to access one or more resources of the enterprise network including one or more access-restricted enterprise resources of the enterprise network using the dedicated connection;
look up user permissions of a user of the registered mobile device; and
control access of the registered mobile device to access the one or more resources for the subsequent requests based on the user permissions and the network address assigned to the registered mobile device.

18. The system of claim 17, wherein the instructions that, when executed by the one or more computer processors of the server, further cause the MVNO-hosted mobile authentication platform to control access of the registered mobile device to the one or more resources over the dedicated connection using the network address assigned to the registered mobile device and based on whether one or more additional authentication factors correspond to one or more authentication factors of the authentication factor data.

19. The system of claim 18, wherein the one or more additional authentication factors include first location data and the one or more authentication factors of the authentication factor data includes second location data and the instructions that, when executed by the one or more computer processors of the server, further cause the MVNO-hosted mobile authentication platform to control access of the registered mobile device to the enterprise network based on whether the first location data matches the second location data.

20. The system of claim 19, wherein the first location data includes a baseband-derived location identification and the second location data includes an application layer-derived device location identification.

* * * * *